Nov. 23, 1965  R. C. HESS  3,219,923
RECEPTACLE HAVING A SLIDING CONTACT SPRING MATING WITH
A CONTACT TERMINAL FOR RECEIVING A TEST PROBE TO
DETERMINE THE ELECTRICAL CONDITION OF A CIRCUIT
Filed March 20, 1961

INVENTOR.
Richard C. Hess.
BY W. L. Stout

HIS ATTORNEY

United States Patent Office 3,219,923
Patented Nov. 23, 1965

3,219,923
RECEPTACLE HAVING A SLIDING CONTACT SPRING MATING WITH A CONTACT TERMINAL FOR RECEIVING A TEST PROBE TO DETERMINE THE ELECTRICAL CONDITION OF A CIRCUIT
Richard C. Hess, Monroeville, Pa., assignor to Westinghouse Air Brake Company, Wilmerding, Pa., a corporation of Pennsylvania
Filed Mar. 20, 1961, Ser. No. 96,808
4 Claims. (Cl. 324—51)

This invention relates to test receptacles, and particularly to one which facilitates the testing of coils on electromagnetic switching devices.

In certain types of control systems involving the use of relays, it is frequently necessary to test these relays for proper operation. It is often desirable, and at times imperative, that this testing be accomplished without closing down or interrupting the operation of the control system. It is also desirable to be able to test each relay in position without having to shift any of the equipment, especially in systems using several hundred relays.

One object of this invention is to provide a test terminal for each relay which will enable the relay to be easily and quickly tested.

Another object of my invention is to provide a test receptacle that is simple and inexpensive to construct.

A further object is to provide a test receptacle which permits the magnitude of the current flowing in the coil of a relay to be measured without interrupting the operation of the relay.

A still further object is the provision of a test receptacle from which the relay coil may be quickly and easily deenergized.

Another object is to provide a receptacle for testing relay coils which may be mounted on the front of the relay.

Generally speaking, the test receptacle of the present invention consists of a contact spring, a holder terminal in which the spring is mounted and a contactor terminal with which the contact spring mates at an angle to form a V-shaped cavity into which a test probe may be inserted. The holder terminal and the contactor terminal may be molded into the front of a relay coil housing and connected in series with the coil winding.

Other objects, purposes and characteristic features of my invention will be, in part, obvious from the accompanying drawings, and, in part, pointed out as the description of my invention progresses and reference is made to the accompanying drawings, in which.

In describing the invention in detail, reference will be made to the various parts of the drawings by distinctive reference characters whereas like parts will be referred to by like reference characters.

Figure 1:
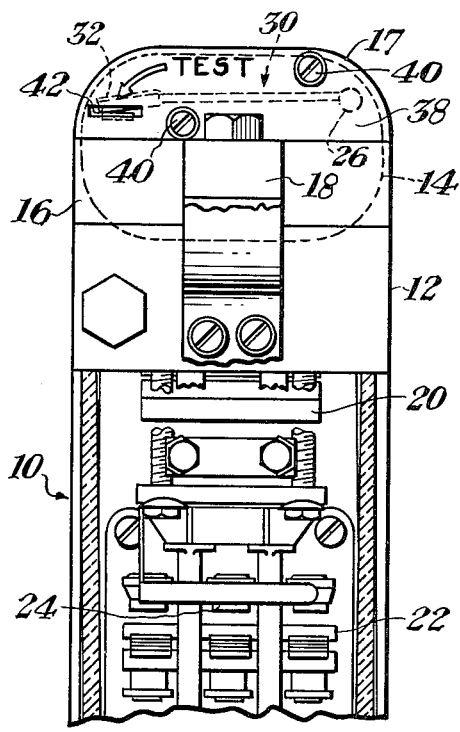
FIG. 1 is a front view of a relay onto which an embodiment of my invention has been mounted, with portions broken away to illustrate, to better advantage, certain details of construction.

While not limited thereto, the test receptacle of the present invention is particularly adapted for use with relays as shown in FIG. 1 of the drawings. The relay shown in FIG. 1 may be of the type shown and described in Letters Patent of the United States No. 2,836,774, granted to Harry E. Ashworth on May 27, 1958, for Magnetic Hold-Down Devices, which is assigned to the assignee of this present invention. This relay, generally indicated 10, includes a frame 12, an energizing coil 14, contained in a coil housing or case 16, mounted on frame 12 with an opening in housing 16 for receiving a core member 18. The relay also includes an armature 20 mounted, in a manner well known in the art, to cooperate with a pole piece (not shown) in accordance with the energized or deenergized condition of the coil. The armature is operatively connected to a ladder 22 of insulating material for the purpose of controlling electrical contacts 24. Energization of coil 14 causes the armature 20 to move upwardly from the position shown with the result that some of the contacts make while others break.

Figure 3:
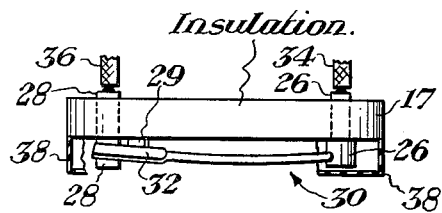
FIG. 3 is a top view of the arrangement shown in FIG. 2.
Figure 2:
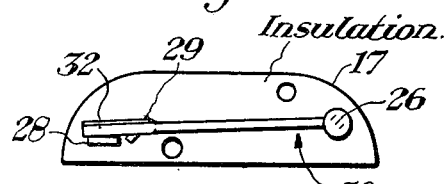
FIG. 2 is a front elevational view of a portion of the arrangement shown in FIG. 1.

Referring now to FIGS. 1, 2 and 3, the front of coil housing 16 of the relay forms the base 17 upon which the test receptacle of the present invention is mounted. As shown, the receptacle consists of a spring holder terminal 26 and a contactor terminal 28, both of which may be molded into the base 17 or rigidly secured therein in any other manner. Terminals 26, 28 are of a conducting material, such as Phosphor bronze, and extend through and protrude from the front and rear surfaces of base 17. An elongated contact spring 30 is, at one end, either rigidly secured to or integrally formed with spring holder terminal 26 and extends therefrom across a portion of the front surface of base 17 and is positioned in spaced relation thereto.

Figure 4:
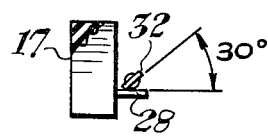
FIG. 4 is a side elevation of the view shown in FIG. 2.

As a result of slightly bowing contact spring 30, its free end 32 rests in separable pressure engagement with a portion of contactor terminal 28 and in sliding engagement with a lug 29, which is formed on the front surface of base 17. In addition, as best illustrated by reference to FIGS. 2, 3 and 4, free end 32 of spring 30 is flattened and the contact spring 30 is so positioned as to provide an angular mating of the free end 32 and the upper surface of contactor terminal 28, thereby forming a V-shaped cavity between end 32 and terminal 28.

A suitable material from which spring 30 may be formed is Phosphor bronze. In order to achieve the highest degree of electrical conductivity through the test receptacle, it is advisable to silverplate terminals 26, 28 and contact spring 30.

The portions of terminals 26, 28, which protrude from the rear surface of base 17, that is to say, inwardly toward coil 14, are adapted to receive wires or leads 34, 36, respectively, for an in series connection of the test receptacle of this invention at either end of the winding of coil 14. In other words, when the coil is energized, and the free end 32 of spring 30 is in pressure engagement with contactor terminal 28, current will flow through a portion of the coil circuit and over lead 34, terminal 26, spring 30, terminal 28, lead 36 and out through the remaining portion of the coil circuit. Of course, this specific example presupposes a polarity arrangement of the source of power (not shown) which would cause current to flow from the coil circuit over lead 34, through the receptacle and out through lead 36. In the event the polarity arrangement were the opposite of that assumed, then current would flow from the coil circuit into lead 36, through the receptacle and out lead 34. Insofar as the operation and effectiveness of the test receptacle is concerned, the specific polarity arrangement of the source of power to the coil is of no importance.

As shown in FIGS. 1 and 3, a receptacle cover 38 is provided which covers the front of base 17 and is secured thereto by screws 40. The cover 38, which is molded or otherwise formed of an insulating material, is provided with a slotted opening 42 which permits communication by a test probe with the V-shaped cavity formed by the angular mating engagement of spring end 32 with terminal 28.

Figure 5:
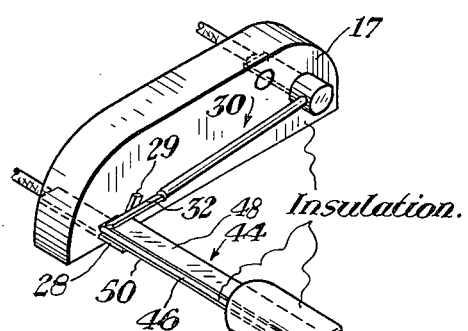
FIG. 5 is a detail perspective view of my test receptacle with a test probe in engagement therewith.

As best illustrated by reference to FIG. 5, the electrical condition of coil 14 is determined by inserting a test probe 44 through opening 42 in cover 38 and into the V-shaped cavity formed by spring end 32 and terminal 28. The test probe 44 shown in FIG. 5 is used to determine the current flowing through the coil and consists of a flat leaf 46 of insulating material the opposite flat surfaces of which are covered by thin strips of an electrically conductive material 48, 50 which are bonded thereto. At one end of leaf 46, wires 52, 54 are secured, as by soldering, to strips 48, 50, respectively. The unsoldered ends of wires 52, 54 are connected into an ammeter 56.

When the unwired end of test probe 44 is inserted into the V-shaped cavity of the test receptacle, spring end 32 is wedged upwardly and out of engagement with terminal 28 and rests in contact with strip 48. At the same time, strip 50 is in contact with terminal 28, thereby placing ammeter 56 in series with coil 14.

Figure 6:
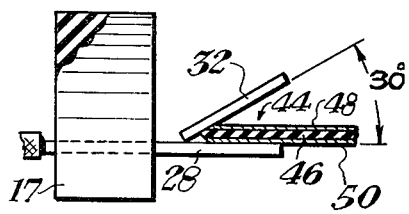
FIG. 6 is an end elevational view of the test receptacle embodying my invention, certain of the parts being broken away or removed to better illustrate the construction of the remaining parts.

The purpose of the angular mating of spring end 32 with a surface of terminal 28 is two-fold. First, it results in the formation of a V-shaped cavity into which a test probe can be quickly and easily wedged to establish a good electrical connection. Secondly, by forming an appropriate acute angle between spring end 32 and a surface of terminal 28, test probe 44 can be inserted into the receptacle without deenergizing coil 14 and thus without interfering with the operation of relay 10. These two features are best illustrated by reference to FIG. 6 wherein an angular relationship of 30° is shown between spring end 32 and terminal 28. In this view the position of test probe 44 is shown just prior to the separation of end 32 and terminal 28. As can be seen, with strips 46, 48 in contact with terminal 28 and spring end 32, respectively, a current branch through ammeter 56 is established. Thus when spring end 32 is separated from terminal 28, the current flow through coil 14 will be uninterrupted since all current will then flow through the ammeter and back into the remainder of the coil circuit. In this manner the continuity of the coil circuit is maintained during a test of the current flow therethrough.

At times it is also desirable to briefly deenergize coil 14 and note the effect on armature 20, contact ladder 22 and contacts 24. This can be accomplished by inserting a probe formed only of insulating material, somewhat similar in general configuration to test probe 44, into the V-shaped cavity of the test receptacle thereby wedging apart spring end 32 and terminal 28. This serves to open the coil circuit and the effect on the operation of the relay may then be noted.

In addition to determining the current flow through the coil and the effects of deenergizing the coil, the test receptacle of this invention may also be used to determine the open coil circuit voltage in the following manner. Referring to FIG. 5, the open circuit voltage may be determined by inserting a voltmeter (not shown) in place of ammeter 56. When probe 44 opens the coil circuit by wedging spring end 32 out of contact with terminal 28, the voltmeter will indicate the open coil circuit voltage.

Although I have shown and described only one form of a test receptacle embodying my invention, it is understood that various changes and modifications may be made therein within the scope of the appended claims without departing from the spirit and scope of my invention.

Having thus described my invention, what I claim is:

1. A receptacle for receiving a test probe to determine the electrical condition of a circuit comprising in combination, a block of insulating material having front and rear sides and provided with first and second terminals extending through and protruding above the surface of the front side of said block, and rigidly secured in spaced relation in said block, said terminals adapted on said rear side of said block for connection in said circuit, an elongated contact spring having one end rigidly secured to said first terminal on the front side of said block, said contact spring having a portion spaced from said secured end in sliding engagement with said front side of said block and extending from said first terminal in substantial parallelism to said front side of said block with its free end in pressure engagement with said second terminal, thereby forming a V-shaped socket into which said test probe may be wedged.

2. A receptacle for receiving a test probe to determine the electrical condition of a circuit comprising in combination, a base of insulating material having front and rear surfaces, first and second terminals mounted in spaced relation in said base and extending through the front and rear surfaces of said base, an integral lug formed on the front surface of said base between said first and second terminals, a contact spring positioned in spaced relation to the front surface of said base with one end of said spring rigidly secured to said first terminal, with the intermediate portion of said spring in sliding contact with the upper surface of said lug and with the free end of said spring in separable pressure contact with said second terminal, said free end of the contact spring being flattened and angularly disposed against said second terminal to form a V-shaped cavity into which said test probe may be wedged.

3. A test receptacle for determining the electrical condition of relay coils comprising in combination, a relay having a coil enclosed in a case of insulating material, said case having inner and outer surfaces, first and second terminals mounted in spaced relation on said case and extending through said inner and outer surfaces, said terminals adapted on the inner side of said case to be connected in series relationship with said coil, a lug positioned on the outer surface of said case between said first and second terminals, a contact spring integrally formed at one end with said first terminal and extending in substantial parallelism along the outer surface of said case with the intermediate portion of said spring in sliding contact with said lug and with the free end of said spring in separable pressure contact with said second terminal, said free end of said spring being flattened and positioned to provide an angular mating of its flattened end with said second terminal to form a V-shaped cavity into which a test plug may be received.

4. A receptacle for receiving a test probe to determine the electrical condition of a circuit comprising in combination, a base of insulating material having front and rear surfaces, first and second terminals mounted in spaced relation in said base and extending through the front and rear surfaces of said base, a lug provided on the front surface of said base between said first and second terminals, a contact spring positioned in spaced relation to the front surface of said base with one end of said spring rigidly secured to said first terminal, with the intermediate portion of said spring in sliding contact with the upper surface of said lug and with the free end of said spring in separable pressure contact with said second terminal, said free end of the contact spring being flattened and angularly disposed against said second terminal to form a V-shaped cavity, and a cover member securely fastened to said base, said cover member having a slotted opening in alignment with said V-shaped cavity thereby permitting communication of said test probe with said V-shaped cavity.

References Cited by the Examiner

UNITED STATES PATENTS 1,887,421  11/1932  Newman _____ 324—74 X
2,795,664  6/1957  Conrad _____ 324—23 X

FOREIGN PATENTS 290,149  7/1953  Switzerland.

WALTER L. CARLSON, *Primary Examiner.*

LLOYD McCOLLUM, *Examiner.*